United States Patent [19]

Leppla et al.

[11] Patent Number: 5,227,188
[45] Date of Patent: Jul. 13, 1993

[54] FLOWABLE COMPACT COFFEE

[75] Inventors: Jeffrey K. Leppla; Steven J. Kirkpatrick; William C. Papa, all of Cincinnati, Ohio

[73] Assignee: The Procter & Gamble Company, Cincinnati, Ohio

[21] Appl. No.: 943,267

[22] Filed: Sep. 10, 1992

[51] Int. Cl.$^5$ .............................................. A23F 5/10
[52] U.S. Cl. .................................... 426/595; 426/388; 426/454
[58] Field of Search ..................... 426/595, 388, 454

[56] References Cited

U.S. PATENT DOCUMENTS

| | | | |
|---|---|---|---|
| Re. 14,520 | 9/1918 | King. | |
| 3,544,331 | 12/1970 | Hair | 99/68 |
| 3,607,299 | 9/1971 | Bolt | 426/454 X |
| 3,615,667 | 10/1971 | Joffe | 99/68 |
| 3,780,197 | 12/1973 | Stefanucci et al. | 426/473 |
| 3,801,716 | 4/1974 | Mahlmann et al. | 426/466 |
| 4,053,652 | 10/1977 | Mahlmann | 426/388 |
| 4,331,696 | 5/1982 | Bruce | 426/595 |
| 4,591,508 | 5/1986 | Pultinas | 426/595 |
| 4,637,935 | 1/1987 | Kirkpatrick et al. | 426/595 X |

*Primary Examiner*—Joseph Golian
*Attorney, Agent, or Firm*—William J. Winter; Thomas H. O'Flaherty; George W. Allen

[57] ABSTRACT

Roasted coffee granules are admixed with roasted coffee non-granules in critical weight ratios. The smaller coffee non-granules include flaked coffee, flaked coffee fines, ground coffee fines, and coffee agglomerates. The larger coffee granules include roast and ground coffee. The coffee granules and coffee non-granules are densified to between 0.41 to 0.56 grams/cc. The compact coffee has the flowability, flavor, aroma and strength of roast and ground coffee. At equal volumes, the compact coffee results in more brewed coffee than conventional roast and ground coffee.

20 Claims, 1 Drawing Sheet

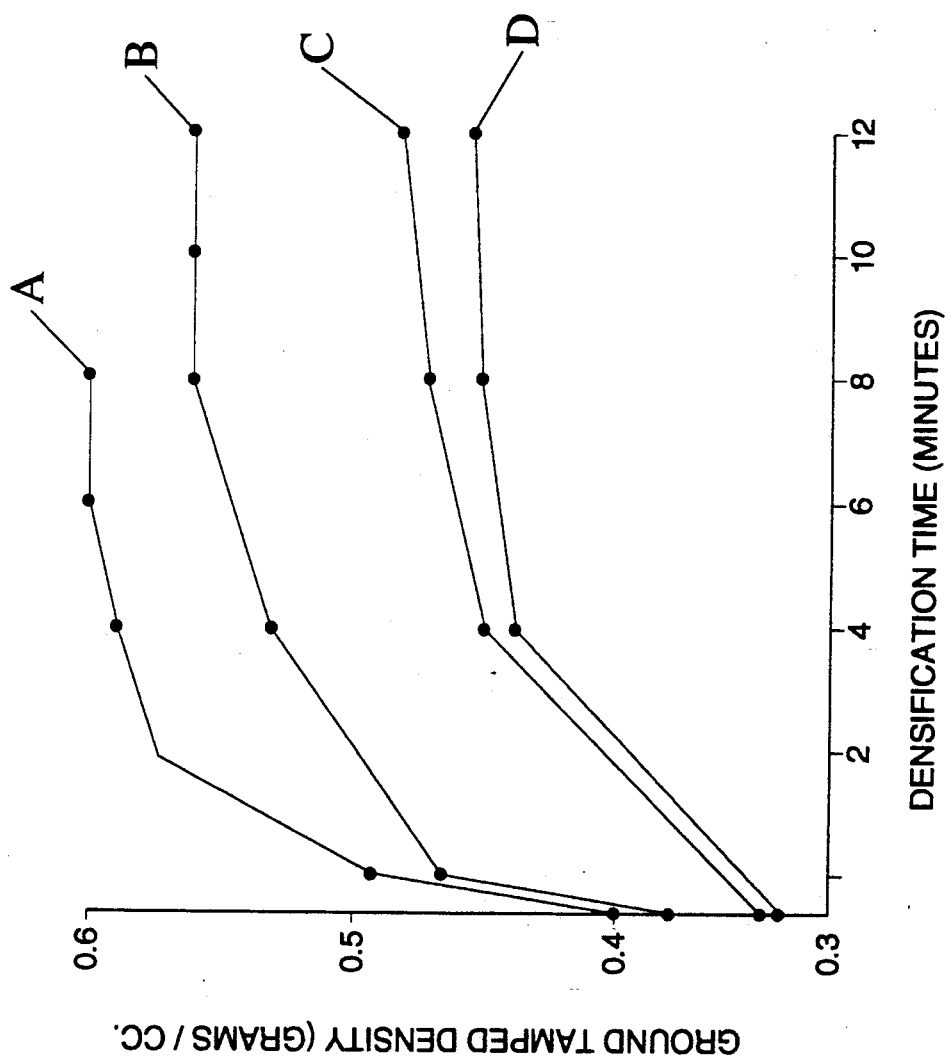

FLOWABLE COMPACT COFFEE

FIELD OF THE INVENTION

This invention relates to flowable compact coffee and processes for making it.

BACKGROUND OF THE INVENTION

Historically, roast and ground coffee has been sold in one, two and three pound cans. One pound cans are considered the standard size. Coffee in a one pound can yields about 88 cups of brewed coffee. A one pound can has a volume of 1000 cc.

Fast roasting processes reduce the density of roasted coffee and increase its extraction yield. Using fast roasting techniques, the industry standard for roast and ground coffee has become a 13-ounce coffee that yields about 88 cups of brewed coffee but has the same dry volume as traditional 16-ounce coffee. This new conventional 13-ounce coffee is marketed in cans having the same dimensions as the traditional one pound cans.

The reduced density trend has been extended to 10.5- and 11.5-ounce coffee that has a dry volume and brew cup yield similar to 16-ounce coffee and 13-ounce coffee.

Fewer coffee beans are required to make reduced density coffee. The reduced density coffee provides a cost savings to coffee manufacturers and consumers. Consumers get an equal number of cups of coffee from fewer coffee beans which the manufacturer can afford to sell for less than conventional roast and ground coffee.

The density of roasted coffee beans and particulate coffee products is controlled by the roasting process. Reduced density coffee has increased extraction yields obtained by utilizing fast roasting processes. Higher density coffee, such as 16-ounce coffee, are obtained by utilizing slow roasting methods.

Reduced density coffee technology has several drawbacks. There are limits below which roast and ground coffee can be easily packaged for sale. Coffee beans can be "puffed up" only so far to fill a 1000 cc container with a given weight of coffee. It is unlikely, for example, that a 6-ounce coffee (i.e., 6-ounces of coffee filling a 1000 cc volume can) could be produced using existing reduced density technology.

Roasting conditions that are optimal for obtaining reduced density coffee are not necessarily optimal for flavor development.

It is highly desirable to have a means for obtaining a particular coffee density which does not rely exclusively upon roasting parameters to achieve the that density. A means is required to optimize density which is independent of roasting conditions.

SUMMARY OF THE INVENTION

This invention provides processes for making flowable compact coffee. Coffee granules and smaller coffee non-granules are admixed in critical weight ratios. The coffee granules include roasted and ground coffee. The coffee non-granules include flaked coffee, flaked coffee fines, ground coffee fines, coffee agglomerates, and mixtures thereof. The coffee granules and coffee non-granules are densified to form a flowable compact coffee.

This invention is also directed to compact coffee. The compact coffee has a flowability, appearance, flavor and strength that is similar to that of conventional roast and ground coffee. The brew cup yield is from about 120 to about 200 cups per a 1000 cc dry volume of the compact coffee.

BRIEF DESCRIPTION OF THE DRAWINGS

The FIGURE is a graph of the ground tamped densities of certain coffee products as a function of densification times. The FIGURE includes densification times from 0 to 12 minutes for four different coffee products. Line C represents conventional roast and ground coffee, line D represents roast and coarsely ground coffee, line A represents flaked coffee and line B represents a 1:1 admixture of the flaked coffee and the roast and coarsely ground coffee. Line B represents the product of the invention. The FIGURE shows the surprisingly short densification times needed to achieve the compact coffee represented by line B.

DEFINITIONS

The terms used herein have the following definitions:

A "one pound can" is a traditional coffee container having a 1000 cc holding capacity.

"10.5-ounce coffee", "11.5-ounce coffee", "13-ounce coffee" and "16-ounce coffee" are roasted coffee products having densities such that 10.5, 11.5, 13 and 16 ounces (298, 327, 369 and 454 grams) of each product, respectively, has a dry volume of about 1000 cc.

"Density" refers to ground tamped density unless otherwise specified. Ground tamped density is used to define densities of coffee granules and coffee non-granules.

"Brew cup yield" is the volume of coffee brewed from 1000 cc of roasted coffee (cups of brewed coffee from a 1000 cc dry volume of roasted coffee). The brewed coffee contemplated by the term "brew cup yield" is one having a flavor, aroma and strength that is comparable to, or better than, that of conventionally brewed roast and ground coffee.

"Coffee granules" are roast and ground coffee particles having an average particle diameter of from about 600 to about 3000 um (about 0.024 to about 0.118 inches). This includes conventional roasted coffee grinds such as regular, drip and fine grinds.

"Coffee non-granules" are roasted coffee particles including coffee flakes, ground coffee fines, flaked coffee fines, coffee agglomerates and mixtures thereof. Flaked coffee fines and ground coffee fines have an average particle diameter less than about 600 um (about 0.024 inches). Flaked coffee has an average flake thickness of from about 102 to about 1016 um (about 0.004 to about 0.04 inches). Coffee agglomerates are agglomerated coffee particles including agglomerated ground coffee fines, agglomerated flaked coffee fines, agglomerated coffee flakes and agglomerated mixtures thereof. Coffee agglomerates have an average agglomerated particle diameter of less than about 600 um (about 0.024 inches).

"Flowable" is the characteristic of particle compositions to be scooped or poured in a manner similar to that of conventional roast and ground coffee.

All ratios and percentages as used herein are based on weight unless stated otherwise.

DETAILED DESCRIPTION OF THE INVENTION

This process involves two procedures. One procedure is an admixing step in which coffee granules are combined with coffee non-granules in critical weight ratios. The other procedure is a densification step in which the combined particles are densified into a flowable compact coffee.

The product and process of the invention, as well as preferred embodiments or elements, are described below.

A) Admixing Coffee Granules with Coffee Non-granules

Coffee granules are combined with coffee non-granules in the admixing step. The admixing step can occur before, after or concurrently with the densification step.

The coffee non-granules are preferably coffee flakes, flaked coffee fines or ground coffee fines, most preferably coffee flakes or flaked coffee fines. The coffee flakes have an average flake thickness of from about 102 to about 1016 um (about 0.004 to about 0.04 inches), preferably from about 102 to about 508 um (about 0.004 to about 0.02 inches), most preferably from about 102 to about 254 um (about 0.004 to about 0.01 inches).

In the admixing step, coffee granules are admixed with coffee non-granules in weight ratios (granules to non-granules) of from about 9:1 to about 0.67:1, preferably from about 3:1 to about 1:1. The weight ratios are critical to the flowability benefits and reduced densification times described hereinafter. At weight ratios less than about 0.67:1 the compact coffee lacks flowability. At weight ratios greater than about 9:1 the compact coffee requires excessive densification times.

The admixing of coffee granules and coffee non-granules, when performed separately from the densification step described hereinafter, can be carried out by conventional processes used to admix dry solids. Non-limiting examples of suitable admixing devices include tumblers, ribbon mixers, Muller mixers, vertical screw mixers, turbine mixers or modified Muller mixers (i.e., mixers with rotating internal shells/devices).

The admixing step also includes processes in which the coffee granules and coffee non-granules are generated and combined in a single operation. For example, admixing includes comminution processes in which roasted coffee beans or particles therefrom are reduced to a composition of coffee granules and coffee non-granules in the critical weight ratios received above.

In the admixing step, some of the coffee non-granules will be reduced in size by shearing forces, however slight. Coffee flakes and coffee agglomerates are especially susceptible to this particle size reduction. The admixing step involves high shear admixing when performed concurrently with the densification step and low shear admixing when performed separately from the densification step. Coffee flakes remaining after low shear admixing will subsequently be reduced to flaked coffee fines during the densification step. Likewise, coffee agglomerates remaining after low shear mixing will subsequently be reduced in the densification step to an average particle diameter of substantially less than about 600 um (0.024 inches).

The coffee granules and coffee non-granules are provided by conventional methods.

B) Densification

In the densification step, the coffee granules and coffee non-granules are densified into flowable compact coffee. The compact coffee has an increased brew cup yield of from about 120 to about 200 cups per 1000 cc. By densifying the coffee granules and coffee non-granules, less volume of the compacted coffee is needed to brew a cup of coffee. The weight of the compact coffee needed to make a cup of brewed coffee is unchanged by the densification step. Preferably, brew cup yields of the compact coffee are further increased to about 160 to about 200 cups per 1000 cc by using coffee granules or coffee non-granules having individually high extraction yields.

In the densification step, coffee granules and coffee non-granules are densified to ground tamped densities of from about 0.41 to about 0.55 grams/cc, preferably from about 0.41 to about 0.51 grams/cc, most preferably from about 0.45 to about 0.51 grams/cc. This step increases ground tamped densities from about 0.03 to about 0.3 grams/cc, most typically from about 0.1 to about 0.2 grams/cc.

Suitable densification devices include those typically used for intensive mixing, particle size modification or particle densification. These devices should provide high shear admixing in the form of high particle-particle interactions. Twin or single rotor mixers are two such devices.

Single rotor mixers are preferred (i.e., Gump normalizer, BF Gump Co., Chicago, Ill.). These mixers consist of a shell with an internal, rotating shaft. The shaft has paddles which induce mixing. The shaft rotates at about 100 to 5000 revolutions per minutes. Single rotor mixers provide the maximum impact short of a grinding mill.

Twin rotor mixers can be used. These mixers have two rotating shafts with attached paddles inside a shell. Twin rotating screws can be used in place of the rotating shafts and attached paddles.

Preferably, the coffee granules and coffee non-granules being densified are maintained in a cool environment, preferably less than about room temperature. The cooler temperatures can be achieved by jacketing the densification device in a low temperature medium or operating the device in a low temperature environment.

The time needed to densify the composition of coffee granules and coffee non-granules in the critical weight ratios recited herein is from about 1 second to about 5 minutes, more typically from about 1 second to about 2 minutes, most typically from about 1 second to about 1.5 minutes. The times will vary within each range among the different densification devices. The times for a particular device are easily determined by the skilled artisan without undue experimentation. The time will also vary within each range depending on the ground tamped density desired (from about 0.41 to about 0.55 grams/cc). The time will also depend on the weight ratios of coffee granules and coffee non-granules being densified. 100% flaked coffee can be densified to between about 0.41 and about 0.55 grams/cc in about 1 second to about 2 minutes. 100% coffee granules require from about 3 to about 12 minutes to achieve densities of from 0.41 to about 0.47 grams/cc. Fast roasted coffee granules typically cannot be densified beyond about 0.47 grams/cc.

The densification times were surprisingly short for the compact coffee containing coffee granules and coffee non-granules in the critical weight ratios recited herein. The FIGURE is a graph of ground tamped densities achieved over time for various coffee products in a Gump normalizer. Such products include flaked coffee having an average flake thickness of about 127 um (line A), roast and coarsely ground coffee having an average particle diameter of about 1000 um (line D), conventional roast and ground coffee having an average particle diameter of about 825 um (line C), and a blend of the coarsely ground coffee and the flaked coffee in a 1:1 weight ratio (line B). The time needed to reach a 0.465 grams/cc density, for example, was 20 seconds for the flaked coffee, 6 minutes for the conventional roast and ground coffee, 12 minutes for the coarsely ground coffee, and only about 30 seconds for the 1:1 blend. For a density of 0.465 grams/cc, the densification time for the 1:1 blend was 1/10th that of the conventional roast and ground coffee and 1/24th that of the coarsely ground coffee. Similar relationships can be seen for ground tamped densities from about 0.41 to about 0.55 grams/cc. Similar relationships can also be seen when other densification devices are used although absolute densification times will vary.

These shorter densification times result in substantial benefits to the compact coffee. Manufacturing operations are more efficient; i.e., fewer densification devices are needed. Also, less heat is generated within the densification device. Less heat means less heat-induced aroma loss in the coffee being densified. There is also less heat-induced agglomeration. This agglomeration results in sticky coffee masses that hamper manufacturing operations. Less heat also reduces the need to provide a low temperature environment around the coffee being densified.

Preferably, the coffee granules are derived from fast roasted coffee means having whole roast tamped densities of from about 0.28 to about 0.38 grams/cc. These coffee granules have ground tamped densities of from about 0.32 to about 0.41 grams/cc. It was found that these coffee granules have reduced densities due mostly to an expansion of inter-granule voids. This is contrary to the prior art which teaches that coffee granules from fast roasted beans have reduced densities due mostly to an expansion of intra-granule voids. In view of this finding, coffee non-granules can be filled into the inter-granule voids. It was also found that the fast roasted, low density coffee granules have a typically high extraction yield even after densification into a compact coffee. The fast roasted beans are obtained by conventional fast roasting processes. Coffee beans are roasted at temperatures of from about 350° to about 1200° F. (about 177° to about 649° C.) for less than about 5.5 minutes, preferably from about 400° to about 800° F. (about 204° to about 427° C.) for from about 10 seconds to about 5 minutes. The fast roasted beans have Hunter L-colors of from about 16 to about 24, preferably from about 16 to about 20. These beans are then cooled and ground into the reduced density coffee granules.

Fast roasting processes are disclosed in U.S. Pat. No. 4,988,590 to Price et al., issued Jan. 29, 1991; U.S. Pat. No. 4,737,376 to Brandlein et al., issued Apr. 12, 1988; U.S. Pat. No. 4,169,164 to Hubbard et al., issued Sep. 25, 1979; and U.S. Pat. No. 4,322,447 to Hubbard, issued Mar. 30, 1982, which patents are herein incorporated by reference. Roasting methods and equipment are disclosed in in Sivetz, Coffee Technology, AVI Publishing Company, Westport, Conn. 1979, pp. 226-246, which is incorporated herein by reference.

It was also found that the compact coffee has an aroma level similar to that of roast and ground coffee. This aroma benefit was surprising since the compact coffee comprises from about 10 to about 60% densified coffee non-granules. It is known that these coffee non-granules have lower levels of aroma.

Coffee aromas are measured by Gas Chromatography (GC) as total GC counts. Total GC counts for the compact coffee are from about 30,000 to about 75,000 counts, typically from about 40,000 to about 65,000 counts. Total GC counts for conventional roast and ground coffee are from about 25,000 to about 45,000 counts. Total GC counts for flaked coffee, flaked coffee fines, ground coffee fines, coffee agglomerates, and mixtures thereof are from about 10,000 to about 20,000 counts. The total GC counts recited above are for non-vacuum packed coffee.

It was also found that the compact coffee has an aroma that is superior to that of either 100% densified coffee granules or 100% densified coffee non-granules. For example, when a coffee product is densified to 0.465 grams/cc, the total GC counts are about 20,000 counts for flaked coffee fines, about 40,000 counts for roast and coarsely ground coffee (average particle diameter of about 1000 um before densification), and about 55,000 counts for a 1:1 (weight ratio) blend of the flaked coffee fines and the roasted and coarsely ground coffee. Flaked coffee fines have lower GC counts even before densification. Coarsely ground coffee have lower GC counts due to longer densification times. The longer times result in more heat-induced aroma loss during densification. The 1:1 blend, however, has higher GC counts due to shorter densification times which result in less heat-induced aroma loss.

The compact coffee is preferably packaged and sealed under non-vacuum conditions. Such conditions provide a compact coffee with about 10 to about 20% higher total GC counts.

It was also found that the compact coffee has an appearance and flowability similar to that of conventional roast and ground coffee. This was was surprising since the compact coffee comprises from about 10 to about 60% densified coffee non-granules. It is known that coffee non-granules, especially when densified, have a powder-like appearance and poor flowability.

C) Flowable, Compact Coffees

A 1000 cc dry volume of the compact coffee weighs from about 426 to about 540 grams (about 15 to 19 ounces). The compact coffee can be packaged in one, two or three pound cans and marketed as 15- to 19-ounce coffee. The one pound can will deliver from about 120 to about 200 cups of brewed coffee. The three pound can will deliver from about 360 to about 600 cups of brewed coffee.

The compact coffee can also be packaged in smaller containers. For example, 8 ounces (227 grams) of the compact coffee could be packaged in 500 cc containers. It would deliver the same brew cup yield as a 1000 cc dry volume of a conventional roast and ground coffee. The flavor, aroma and strength of coffee brewed from the 500 cc compact coffee would be comparable to, or better than, that of the 1000 cc conventional roast and ground coffee.

The compact coffee can be combined with soluble coffees or admixed with non-coffee materials. It can be caffeinated or decaffeinated. It can also be added to filter packs or used to manufacture soluble coffee. Soluble coffee particles can be compacted with the coffee non-granules.

F. Test Methods

1) Tamped Densities

Whole roast tamped densities represent the densities of roasted coffee beans. Whole roasted coffee beans (200 grams) are vibrated by conventional means in a 1000 ml graduated cylinder for 30 seconds. The volume of beans are then measured to the nearest 5 ml graduation. The whole roast tamped density is determined by dividing the weight of the coffee (grams) by the volume (cc's) occupied by the beans in the cylinder after vibrating.

Ground tamped densities represent the densities of roasted coffee particles including coffee granules and coffee non-granules. The method is the same as that for whole roast tamped densities except that 300 grams of the particles are vibrated in the graduated cylinder and the vibrating continues for 1 minute.

2) Coffee Aroma Levels

As used herein, coffee aromas are measured via gas chromatography. The flame ionization gas chromatograph analytical measurement herein measures the total content of organic compounds in a gas headspace or voidspace sample from packaged coffee on a scale of relative intensity. The scale is graduated in microvolt-seconds (referred to herein as "counts") which is a measure of the area under the intensity curve, and the result is reported as an integration of the total area under the curve in total microvolt-seconds ("total counts").

The gas chromatograph comprises a 36 inch chromosorb WAW (acid washed) 60/80 mesh column of ¼ in. diameter and is housed in an oven section for isothermal temperature control. A Hewlett Packard gas chromatograph (Model 700), electrometer (Model 5771A), integrator (Model 3370A), and recorder (Model 7127D), range 0–5 mv. and temperature controller (Model 220) were used.

Each peak is measured in counts, the counts being first measured by the flame detector and then both integrated and recorded. The number of counts for a particular component is directly proportional to the number of milligrams of that component in the vapor sample.

The coffee sample is packed under atmospheric pressure and held for 14 days at 75°±5° F. (24±3C) before sampling. The non-vacuum package, now under pressure after 14 days, is punctured and the package pressure allowed to fall to atmospheric pressure before resealing the non-vacuum package. The resealed package is allowed to equilibrate for 1 hour at 75°±5° F. (24±3C) to allow aroma phase equilibration.

After equilibration, a 1.0 cc sample of the aromatic atmosphere of the canister headspace/voidspace is taken and injected into the inlet port of the gas chromatograph. Resulting GC counts are corrected for temperature and pressure.

3) Roast Colors of Coffee Beans

The Hunter color scale system defines the color of coffee beans and the degree to which they have been roasted. The Hunter color scale system is described in an article by R. S. Hunter, "Photoelectric Color Difference Meter," *Journal of the optical society of America*, 48, 985–95 (1958), and in U.S. Pat. No. 3,003,388 to Hunter et al., issued Oct. 10, 1961. Both references are incorporated herein by reference.

EXAMPLES

Preparation and characteristics of flowable compact coffee are illustrated by the following examples.

EXAMPLE 1

Batch A: A batch of 100% natural Robustas having an initial green bean moisture content of 11% are dried at 160° F. (71° C.) for 6 hours on a belt dryer to a moisture level of 5%. The dried beans are then roasted in a Thermalo roaster, Model Number 23R, manufactured by Jabez Burns, under fast roasting conditions using 100 lb (45 kg) batches and a gas burner input rate of 1.7 million Btu.hr (498 kW). Roasting time is 120 seconds. After roasting, the beans have a whole roast tamped density of about 0.31 grams/cc and a Hunter L-color of about 15. After roasting, the beans are water quenched.

Batch B: A blend of green coffee beans (75% washed Arabicas and 25% natural Arabicas) with a moisture content of 11% are roasted in a Thermalo roaster in the manner described for Batch A. A gas burner input rate of 1.4 million Btu/hr (410 kW) are used to roast 100 lb (45 kg) of the beans for 165 seconds. After roasting, the beans have a whole roast tamped density of about 0.35 grams/cc and a Hunter L-color of 18. These beans are also water quenched.

Coffee non-granules (flaked coffee): Whole roast beans from Batches A and B are combined to form a 20:80 (A:B) blend. The blended beans are cracked, normalized and ground to particles having an average particle diameter of 900 um (0.035 inches) and then flaked to an average 127 um (0.005 inches) thickness. Density is about 0.375 grams/cc.

Coffee granules: Whole roast beans from Batch B are cracked, normalized and ground to particles having an average diameter of from about 1000 to about 1200 um (about 0.039 to about 0.047 inches).

Admixing/densification: The flaked coffee (22.5 lb/10.2 kg) is admixed and densified with the coffee granules (22.5 lb/10.2 kg) in a Gump normalizer to a density of about 0.465 grams/cc. Densification time is 30 seconds. The total GC count is about 55,000 counts. Brew cup yield is about 176 cups/1000 cc.

EXAMPLE 2

Coffee non-granules (ground coffee fines): Whole roast beans from Batches A and B, Example 1, are combined to form a 20:80 (A:B) blend. The blended beans are cracked, normalized and ground to an average particle diameter of from about 500 to about 700 um (about 0.02 to about 0.028 inches). The density is 0.375 grams/cc.

Coffee granules: Whole roasted beans from Batch B, Example 1, are cracked, normalized and ground to particles having an average particle diameter of from about 1000 to about 1200 um (about 0.039 to about 0.047 inches).

Admixing/densification: The coffee non-granules and coffee granules (500–700 um coffee non-granules, 1000–1200 um coffee granules) are admixed in a 1:1 weight ratio and concurrently densified in a Gump normalizer. Densification time is about 5 minutes. The resulting density is about 0.53 grams/cc. Total GC count is about 52,000 counts. Brew cup yield is about 176 cups/1000 cc.

EXAMPLE 3

Whole roast beans from Batch B, Example 1, are cracked (average particle diameter of about 0.254 to 0.33cm /0.1–0.13 inches). Coffee flakes (22.5 lb/10.2 kg) from Example 1 are admixed and densified with the cracked beans (22.5 lb/10.2 kg) in a Gump normalizer to 0.345 grams/cc. The resulting product is ground (grinding parameters same as in Example 2) and re-densified (Gump normalizer) to a density of about 0.465 grams/cc. Time of redensification is about 20 seconds. The total GC count is about 45,000 counts. Brew cup yield is about 176 cups/1000 cc.

EXAMPLE 4

Batch C: A blend of green coffee beans (⅓ Robustas, ⅓ Washed Arabicas, ⅓ Natural Arabicas) having an initial green bean moisture content of 11% is roasted in a Thermalo roaster under fast roasting conditions using 100 lb (45 kg) batches and a gas burner input rate of 1.4 million Btu.hr (498 kW). Roasting time is 165 seconds. After roasting, the beans have a whole roast tamped density of about 0.34 grams/cc and a Hunter L-color of about 17. After roasting, the beans are water quenched.

Coffee non-granules (flaked coffee): Whole roast beans from Batch C are ground to an average particle diameter of 900 um (0.035 inches) and flaked to a 127 um (0.005 inches) average flake thickness. Density is about 0.375 grams/cc.

Coffee granules: Whole roast beans from Batch C are ground into particles having an average particle diameter of from about 1000 to about 1200 um (about 0.039 to about 0.047 inches).

Densification/admixing: The flaked coffee (22.5 lb/10.2 kg) from Batch C is admixed and densified (Gump normalizer) with the granules (22.5 lb/10.2 kg) from Batch C. The resulting density is about 0.465 grams/cc. Densification time is 30 seconds. The total GC count is about 49,000 counts. Brew cup yield is about 140 cups/1000 cc.

What is claimed is:

1. A process for making flowable compact coffee which comprises:
    (a) admixing roasted coffee granules having an average particle diameter of from about 600 to about 3000 um and roasted coffee non-granules selected from the group consisting of ground coffee fines having an average particle diameter of less than about 600 um, flaked coffee fines having an average particle diameter of less than about 600 um, coffee flakes having an average flake thickness of from about 102 to about 1016 um, coffee agglomerates having an average particle diameter of less than about 600 um, and mixtures thereof, wherein the weight ratios of roasted coffee granules to roasted coffee non-granules are from about 9:1 to about 0.67:1; and
    (b) densifying the roasted coffee granules and the roasted coffee non-granules to form a flowable compact coffee having a ground tamped density of from about 0.41 to about 0.55 grams/cc; wherein the compact coffee has a brew cup yield of from about 120 to about 200 cups per a 1000 cc dry volume of the compact coffee.

2. A process according to claim 1 wherein the weight ratios of roasted coffee granules to roasted coffee non-granules in said admixing step (a) are from about 3:1 to about 1:1.

3. A process according to claim wherein the roasted coffee granules are derived from coffee beans roasted at temperatures of from about 177° C. to about 649° C. for less than about 5.5 minutes to a Hunter L-color of from about 16 to about 24 and to a whole roast tamped density of from about 0.28 to about 0.38 grams/cc.

4. A process according to claim 3 wherein the roasted coffee granules are derived from coffee beans roasted at temperatures of from about 204° to about 427° C. for from about 10 seconds to about 5 minutes to a Hunter L-color of from about 16 to about 20.

5. A process according to claim 1 wherein the roasted coffee granules and the roasted coffee non-granules are densified in said densification step (b) to about 0.41 to about 0.51 grams/cc.

6. A process according to claim 1 wherein the roasted coffee granules and the roasted coffee non-granules are densified in said densification step (b) to about 0.45 to about 0.51 grams/cc.

7. A process according to claim 1 wherein the roasted coffee non-granules are selected from the group consisting of flaked coffee fines having an average particle diameter of less than about 600 um, coffee flakes having an average flake thickness of from about 102 to about 1016 um, and mixtures thereof.

8. A process according to claim 7 wherein the coffee flakes have an average flake thickness of from about 102 to about 508 um.

9. A process according to claim 7 wherein the coffee flakes have an average flake thickness of from about 102 to about 254 um.

10. A flowable compact coffee made by the process comprising:
    (a) admixing roasted coffee granules having an average particle diameter of from about 600 to about 3000 um and roasted coffee non-granules selected from the group consisting of ground coffee fines having an average particle diameter of less than about 600 um, flaked coffee fines having an average particle diameter of less than about 600 um, coffee flakes having an average flake thickness of from about 102 to about 1016 um, coffee agglomerates having an average particle diameter of less than about 600 um, and mixtures thereof, wherein the weight ratios of roasted coffee granules to roasted coffee non-granules are from about 9:1 to about 0.67:1; and
    (b) densifying the roasted coffee granules and the roasted coffee non-granules to form a flowable compact coffee having a ground tamped density of from about 0.41 to about 0.55 grams/cc; wherein the compact coffee has a total GC count of from about 30,000 to about 75,000, and a brew cup yield of from about 120 to about 200 cups per a 1000 cc dry volume of the compact coffee.

11. A compact coffee according to claim 10 wherein the weight ratios of roasted coffee granules to roasted coffee non-granules are from about 3:1 to about 1:1.

12. A compact coffee according to claim 10 wherein the roasted coffee granules are derived from coffee beans roasted at temperatures of from about 177° to about 649° C. for less than about 5.5 minutes to a Hunter L-color of from about 16 to about 24 and to a whole roast tamped density of from about 0.28 to about 0.38 grams/cc.

13. A compact coffee according to claim 12 wherein the roasted coffee granules are derived from coffee beans roasted at temperatures of from about 204° to about 427° C. for from about 10 seconds to about 3 minutes to a Hunter L-color of from about 16 to about 20.

14. A compact coffee according to claim 10 wherein the compact coffee has a ground tamped density of from about 0.41 to about 0.51 grams/cc.

15. A compact coffee according to claim 10 wherein the compact coffee has a ground tamped density of from about 0.45 to about 0.51 grams/cc.

16. A compact coffee according to claim 10 wherein the roasted coffee non-granules are selected from the group consisting of flaked coffee fines having an average particle diameter of less than about 600 um, coffee flakes having an average flake thickness of from about 102 to about 1016 um, and mixtures thereof.

17. A compact coffee according to claim 16 wherein the coffee flakes have an average flake thickness of from about 102 to about 508 um.

18. A compact coffee according to claim 16 wherein the coffee flakes have an average flake thickness is from about 102 to about 254 um.

19. A process for making flowable compact coffee which comprises:
(a) admixing roasted coffee granules having an average particle diameter of from about 600 to about 3000 um and roasted coffee non-granules selected from the group consisting of flaked coffee fines having an average particle diameter of less than about 600 um, coffee flakes having an average flake thickness of from about 102 to about 254 um and mixtures thereof, wherein the weight ratios of roasted coffee granules to roasted coffee non-granules are from about 3:1 to about 1:1; and
(b) densifying the roasted coffee granules and the roasted coffee non-granules to form a flowable compact coffee having a ground tamped density of from about 0.45 to about 0.50 grams/cc; wherein the compact coffee has a total GC count of from about 30,000 to about 75,000 counts, and a brew cup yield of from about 160 to about 200 cups per a 1000 cc dry volume of the compact coffee.

20. A compact coffee according to claim 19 wherein the roasted coffee granules are derived from coffee beans roasted at temperatures of from about 204° to about 427° C. for from about 10 seconds to about 5 minutes to a Hunter L-color of from about 16 to about 20 and to a whole roast tamped density of from about 0.28 to about 0.38 grams/cc.

* * * * *